US012670846B2

(12) United States Patent
Wu et al.

(10) Patent No.: US 12,670,846 B2
(45) Date of Patent: Jun. 30, 2026

(54) TILED DISPLAY PANEL

(71) Applicant: AUO Corporation, Hsinchu City (TW)

(72) Inventors: Chia-Jung Wu, Hsinchu City (TW); Yueh-Chi Wu, Hsinchu City (TW); Ya-Ling Hsu, Hsinchu City (TW); Yueh-Hung Chung, Hsinchu City (TW); Ti-Kuei Yu, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 1 day.

(21) Appl. No.: 18/826,172

(22) Filed: Sep. 5, 2024

(65) Prior Publication Data

US 2025/0279036 A1 Sep. 4, 2025

(30) Foreign Application Priority Data

Feb. 29, 2024 (TW) ................................ 113107215

(51) Int. Cl.

| | |
|---|---|
| ***G09G 3/32*** | (2016.01) |
| ***G09F 9/302*** | (2006.01) |
| ***G09F 9/33*** | (2006.01) |
| ***G09F 9/35*** | (2006.01) |
| ***G09G 3/36*** | (2006.01) |

(52) U.S. Cl.

CPC ............... *G09G 3/32* (2013.01); *G09F 9/302* (2013.01); *G09F 9/3026* (2013.01); *G09F 9/33* (2013.01); *G09F 9/35* (2013.01); *G09G 3/3611* (2013.01); *G09G 2300/026* (2013.01); *G09G 2300/0426* (2013.01)

(58) Field of Classification Search

CPC .. G09G 3/32; G09G 3/3611; G09G 2300/026; G09G 2300/0426; G09F 9/302; G09F 9/3026; G09F 9/33; G09F 9/35

USPC ........................................................... 345/55

See application file for complete search history.

(56) References Cited

U.S. PATENT DOCUMENTS

| | | | | |
|---|---|---|---|---|
| 6,496,238 | B1 * | 12/2002 | Greene | ................ G02F 1/1345 349/73 |
| 10,210,790 | B2 | 2/2019 | Cheng | |
| 10,431,142 | B2 | 10/2019 | Cheng | |
| 10,475,371 | B2 | 11/2019 | Cheng | |
| 10,535,297 | B2 | 1/2020 | Cheng | |
| 10,600,351 | B2 | 3/2020 | Cheng | |
| 11,011,105 | B2 | 5/2021 | Wang et al. | |

(Continued)

FOREIGN PATENT DOCUMENTS

| | | |
|---|---|---|
| CN | 204884441 | 12/2015 |
| CN | 105453159 | 3/2016 |

(Continued)

*Primary Examiner* — Jason M Mandeville
(74) *Attorney, Agent, or Firm* — JCIPRNET

(57) ABSTRACT

A tiled display panel is provided. The tiled display panel includes multiple substrates, multiple liquid crystal pixels, multiple LED pixels, and multiple light-emitting circuits. Each substrate has a display region and a boundary region. The boundary region is located between the display region and the tiled boundary tiled by the substrates. The liquid crystal pixels are arranged in an array in the display region. The LED pixels are arranged in series in the boundary region. The light-emitting circuits are arranged in series in the boundary region along a first direction and are electrically connected to the LED pixels to provide multiple light-emitting signals for the LED pixels.

17 Claims, 14 Drawing Sheets

(56) References Cited

U.S. PATENT DOCUMENTS

| | | | |
|---|---|---|---|
| 11,659,750 | B2 * | 5/2023 | Kim ..................... H10H 20/851 345/55 |
| 12,002,410 | B2 * | 6/2024 | Chen ........................ G09G 3/32 |
| 12,078,881 | B2 | 9/2024 | Zheng |
| 12,204,189 | B2 * | 1/2025 | Zhao ................. G02F 1/133388 |
| 2007/0285592 | A1 * | 12/2007 | Morimoto .......... H10D 30/6732 257/E29.294 |
| 2012/0162179 | A1 | 6/2012 | Tanaka et al. |
| 2015/0022424 | A1 | 1/2015 | Jepsen |
| 2017/0249119 | A1 | 8/2017 | Ding et al. |
| 2018/0137800 | A1 | 5/2018 | Cheng |
| 2018/0137806 | A1 | 5/2018 | Cheng |
| 2018/0137807 | A1 | 5/2018 | Cheng |
| 2018/0137812 | A1 | 5/2018 | Yan et al. |
| 2018/0137815 | A1 | 5/2018 | Cheng |
| 2018/0137816 | A1 | 5/2018 | Cheng |
| 2018/0138276 | A1 | 5/2018 | Cheng |
| 2021/0056889 | A1 | 2/2021 | Wang et al. |
| 2021/0109389 | A1 * | 4/2021 | Fan ..................... G02F 1/13452 |
| 2022/0365738 | A1 * | 11/2022 | Li ............................ G09G 3/32 |
| 2023/0009494 | A1 | 1/2023 | Noh et al. |
| 2024/0019727 | A1 | 1/2024 | Zheng |
| 2024/0027814 | A1 * | 1/2024 | Zhao .................. G02F 1/13336 |
| 2024/0353709 | A1 * | 10/2024 | Fu ............................. G09F 9/33 |

FOREIGN PATENT DOCUMENTS

| | | |
|---|---|---|
| CN | 106449661 | 2/2017 |
| CN | 106972045 | 7/2017 |
| CN | 108010933 | 5/2018 |
| CN | 108711576 | 10/2018 |
| CN | 113703211 | 11/2021 |
| TW | 1534503 | 5/2016 |
| TW | 201818387 | 5/2018 |
| TW | 202109485 | 3/2021 |
| TW | 1740653 | 9/2021 |

* cited by examiner

TILED DISPLAY PANEL

CROSS-REFERENCE TO RELATED APPLICATION

This application claims the priority benefit of Taiwan application serial no. 113107215, filed on Feb. 29, 2024. The entirety of the above-mentioned patent application is hereby incorporated by reference herein and made a part of this specification.

BACKGROUND

Technical Field

The disclosure relates to a display panel, and in particular to a tiled display panel.

Description of Related Art

Limited by the physical limitations of semiconductor technology, the panel sizes that can be quantified by LCD panel factories today are still limited. The main reason is that the higher the size of the panel, the higher the cost and the lower the yield. As a result, the higher the size of the panel, the lower the supply. However, given the significant benefits of LCD panels in advertising and marketing, the demand of the market for large panels is becoming increasingly intense. Therefore, using panels of existing sizes for further assembling into large panels is now a feasible way to achieve large panels.

With the advancement of packaging technology, the borders of LCD panels have become very narrow. However, when the panels are tiled together, the tiled lines between the panels make the frame discontinuous, which affects the viewing experience. Therefore, how to achieve seamless tiling of tiled display panels is an important issue to improve the viewing experience.

SUMMARY

The disclosure provides a tiled display panel which can shorten the undisplayable frame of a liquid crystal panel to achieve a purpose of seamless tiling of the tiled display panel.

A tiled display panel of the disclosure includes multiple substrates, multiple liquid crystal pixels, multiple light-emitting diode (LED) pixels, and multiple light-emitting circuits. Each of the substrates has a display region and a boundary region. The boundary region is respectively located between the display region and a tiled boundary tiled by the substrates. The liquid crystal pixels are arranged in an array in the display region. The LED pixels are arranged in an array in the boundary region. The light-emitting circuits are arranged in series in the boundary region along a first direction and are electrically connected to the LED pixels to provide multiple light-emitting signals for the LED pixels.

A tiled display panel of the disclosure includes multiple substrates, multiple liquid crystal pixels, and multiple light-emitting driving line. Each of the substrates has a display region and a boundary region. The boundary region is respectively located between the display region and a tiled boundary tiled by the substrate. The liquid crystal pixels are arranged in an array in the display region. The LED pixels are arranged in an array in the boundary region. The light-emitting driving lines receive multiple light-emitting signals, span the boundary region along a first direction, and are electrically connected to the LED pixels to provide the light-emitting signals for the LED pixels.

Based on the above, in the tiled display panel according to the embodiment of the disclosure, the LED pixels may be lit up based on the light-emitting signal of the light-emitting circuit. In this way, the LED pixels may be driven normally, and the seamless tiled effect can be achieved by taking the advantage of the borderless LED pixel.

In order to make the above-mentioned features and advantages of the disclosure comprehensible, embodiments are given below and described in detail with reference to the accompanying drawings.

DESCRIPTION OF THE EMBODIMENTS

Unless otherwise defined, all terms (including technical and scientific terms) used herein have the same meaning as commonly understood by one of ordinary skill in the art to which the disclosure belongs. It is further understood that terms such as those defined in commonly used dictionaries should be interpreted as having meanings consistent with the relevant art and the background or context of the disclosure, and should not to be interpreted in an idealized or overly formal manner, unless otherwise defined in the embodiments of the disclosure.

It should be understood that, although the terms “first”, “second”, “third”, etc. may be used herein to describe various elements, components, regions, layers, and/or portions, these elements, components, regions, layers, and/or portions should not be limited by these terms. These terms are only used to distinguish one element, component, region, layer, or portion from another element, component, region, layer, or portion. Thus, a "first element", "component", "region", "layer", or "portion" discussed below could be termed a second element, component, region, layer, or portion without departing from the teachings herein.

The terminologies used herein are only for the purpose of describing particular embodiments and are not restrictive. As used herein, the singular forms "a," "an," and "the" are intended to include the plural forms including "at least one" or represent "and/or" unless the content clearly indicates otherwise. As used herein, the terminology "and/or" includes any and all combinations of one or more of the associated listed items. It should also be understood that when used in this disclosure, the terminologies "include" and/or "comprise" indicate the presence of the described features, regions, overall scenarios, steps, operations, elements, and/or components but do not exclude the presence or addition of one or more other features, regions, overall scenarios, steps, operations, elements, components, and/or combinations thereof.

Figure 1:
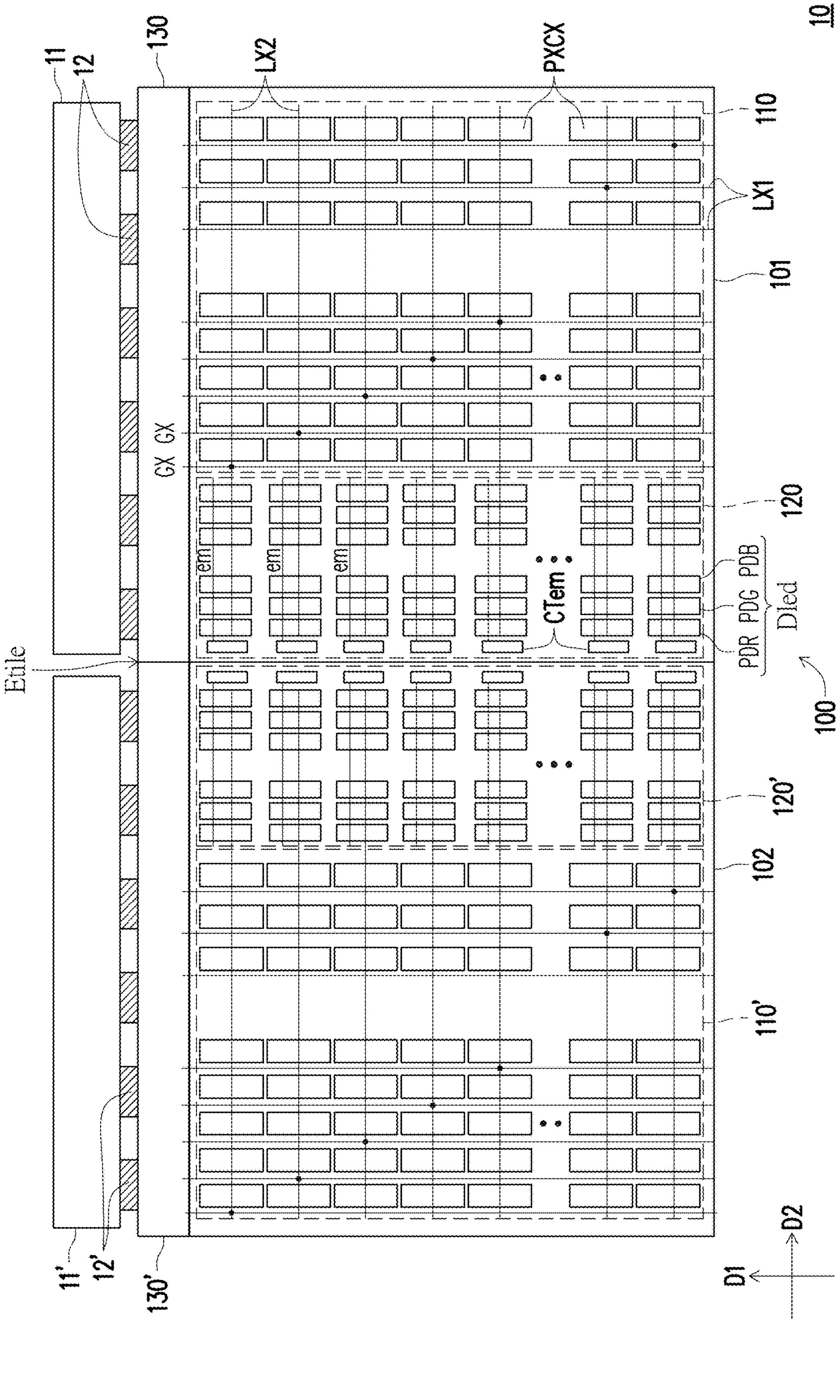
FIG. 1 is a schematic system diagram of a display device according to an embodiment of the disclosure.

FIG. 1 is a schematic system diagram of a display device according to an embodiment of the disclosure. Please refer to FIG. 1. In this embodiment, a display device 10 includes multiple tiled display panels 100, multiple control substrates (such as 11 and 11'), and multiple thin-film substrates (such as 12 and 12'). The tiled display panel 100 includes multiple substrates (here, two substrates 101 and 102 are taken as an example), multiple liquid crystal pixels PXCX, a multiple LED pixels (multiple red LED pixels PDR, multiple green LED pixels PDG, and multiple blue LED pixels PDB are taken as an example), multiple light-emitting circuits CTem, multiple first gate lines LX1, and multiple second gate lines LX2. The liquid crystal pixel PXCX is driven by voltage, and the red LED pixel PDR, the green LED pixel PDG, and the blue LED pixel PDB are driven by a current. Moreover, the thin-film substrate (such as 12 and 12') is configured to be electrically connected to the tiled display panel 100 and the control substrate (such as 11 and 11').

In this embodiment, each substrate (such as 101 and 102) has a display region (such as 110 and 110'), at least one boundary region (such as 120 and 120'), and a fan-in region (such as 130 and 130'). The number of boundary regions (such as 120 and 120') depends on the tiled requirements of the substrate (101 and 102), and the boundary region (such as 120 and 120') are respectively located between the display region (such as 110 and 110') and the tiled boundary Etile tiled by the substrates 101 and 102. The liquid crystal pixels PXCX are arranged in an array in the display region (such as 110 and 11''), and the red LED pixel PDR, the green LED pixel PDG, and the blue LED pixel PDB are arranged in an array in the boundary region (such as 120 and 120'). The light-emitting circuits CTem are arranged in series in the boundary region (such as 120 and 120') along a first direction D1, and are electrically connected to the red LED pixels PDR, the green LED pixels PDG, and the blue LED pixels PDB to provide multiple light-emitting signals em for the red LED pixels PDR, the green LED pixels PDG, and the blue LED pixels PDB.

Taking the substrate 101 as an example, the first gate line LX1 spans the display region 110 along the first direction D1 and receives multiple gate signals GX enabled in sequence. The second gate line LX2 spans the display region 110 and the boundary region 120 along the second direction D2 perpendicular to the first direction D1. Each second gate line LX2 is electrically connected to one of the first gate lines LX1 (for example, through a hole), a row (or part) of liquid crystal pixels PXCX, a row (or part) of red LED pixels PDR, green LED pixels PDG, and blue LED pixels PDB to transmit the gate signal GX to the liquid crystal pixel PXCX, the red LED pixel PDR, the green LED pixel PDG, and the blue LED pixel PDB.

Based on the above, the liquid crystal pixel PXCX, the red LED pixel PDR, the green LED pixel PDG, and the blue LED pixel PDB may write data voltage based on the gate signal (such as GX) transmitted by the second gate line (such as LX2). Moreover, the red LED pixel PDR, the green LED pixel PDG, and the blue LED pixel PDB may be lit up based on the light-emitting signal em of the light-emitting circuit CTem. In this way, the liquid crystal pixel PXCX, the red LED pixel PDR, the green LED pixel PDG, and the blue LED pixel PDB may be driven normally, and the seamless tiled effect may be achieved by taking the advantage of no boundaries of the red LED pixel PDR, the green LED pixel PDG, and the blue LED pixel PDB.

In this embodiment, the light-emitting circuits CTem are arranged in series between the red LED pixels PDR, the green LED pixels PDG, the blue LED pixels PDB, and the tiled boundary Etile.

In this embodiment, a control circuit (such as a timing controller) may be disposed on the control substrate (such as 11 and 11'), and a driving circuit (such as a gate driver and source driver) may be disposed on the thin-film substrate (such as 12 and 12'). Further, the circuits on the control substrate 11 and the thin-film substrate 12 are configured to drive the liquid crystal pixel PXCX, the red LED pixel PDR, the green LED pixel PDG, and the blue LED pixel PDB on the substrate 101. Moreover, the circuits on the control substrate 11' and the thin-film substrate 12' are configured to drive the liquid crystal pixel PXCX, the red LED pixel PDR, the green LED pixel PDG, and the blue LED pixel PDB on the substrate 102.

In this embodiment, the material of the substrates 101 and 102 includes one of a P-type amorphous silicon (a-Si) substrate, an N-type a-Si substrate, an indium gallium zinc oxide (IGZO) substrate, and a low-temperature polycrystalline silicon (LTPS) substrate.

In the embodiment of the disclosure, the red LED pixel PDR, the green LED pixel PDG, and the blue LED pixel PDB may be arranged in sequence. For example, starting from the tiled boundary Etile, the first column may be the red LED pixel PDR, and the second column may be the green LED pixel PDG, and the third column may be the blue LED pixel PDB. Alternatively, the red LED pixel PDR, the green LED pixel PDG, and the blue LED pixel PDB may be arranged obliquely. For example, the first row is the red LED pixel PDR, the green LED pixel PDG, and the blue LED pixel PDB arranged in sequence, the second row is the green LED pixel PDG, the blue LED pixel PDB, and the red LED pixel PDR arranged in sequence, the third row is the blue LED pixel PDB, the red LED pixel PDR, and the green LED pixel PDG arranged in sequence, and so on. Moreover, the arrangement of the colors of the liquid crystal pixels PXCX (that is, the color filters) is essentially aligned with the arrangement of the red LED pixels PDR, the green LED pixels PDG, and the blue LED pixels PDB, but the embodiment of the disclosure is not limited thereto.

In the embodiment of the disclosure, three adjacent red LED pixel PDR, green LED pixel PDG, and blue LED pixel PDB may be integrated into one LED die Dled to facilitate transfer to the substrate (such as 101 and 102).

In this embodiment, in order to match the number of first gate lines LX1 and the number of second gate lines LX2, part of the first gate line LX1 is not electrically connected to the second gate line LX2, or part of the first gate line LX1 may be omitted, but the embodiment of the disclosure is not limited thereto.

FIG. 2A to FIG. 2D are schematic wiring diagrams of a tiled display panel according to an embodiment of the disclosure. Please refer to FIG. 1 and FIG. 2A. In this embodiment, taking the substrate 101 as an example, the first gate line (such as LX1(n−2)~LX1(n+3)) of the display region 110 receives the gate signal (such as GX(n−2)~GX (n+3)), and the second gate line (such as LX2(n−2)~LX2 (n+3)) is electrically connected to the first gate line (such as LX1(n−2)~LX1(n+3)).

In addition to the light-emitting circuit (such as CTem(n−2)~CTem(n+3)), the red LED pixel PDR, the green LED pixel PDG, and the blue LED pixel PDB, multiple first break over line Ltu1 may be disposed in the boundary region 120, be electrically connected to one of the second gate lines (such as LX2(n−2)~LX2(n+3)) respectively, and extend along the first direction D1 respectively to be electrically connected to a first-level light-emitting circuit and a next-level light-emitting circuit of the light-emitting circuit (such as CTem(n−2)~CTem (n+3)), where n is a directive number.

For example, the first break over line Ltu1 electrically connected to the second gate line LX2(n) extends bidirectionally along the first direction D1 (that is, extending up and down simultaneously) to be electrically connected to the light-emitting circuit CTem(n−2) (that is, the first two levels of the light-emitting circuit CTem) and the light-emitting circuit CTem(n 2) (that is, the next two levels of the light-emitting circuit CTem), but the embodiment of the disclosure is not limited thereto. In other words, the first break over line Ltu1 may be electrically connected to the first three levels of the light-emitting circuit CTem and the next one level of the light-emitting circuit CTem, or the first break over line Ltu1 may be electrically connected to the first one level of the light-emitting circuit CTem and the next three levels of the light-emitting circuit CTem, which depends on the circuit design. Based on the above, the configuration direction of the first-level light-emitting circuit CTem relative to the second gate line (such as LX2(n−2)~LX2(n+3)) electrically connected to each first break over line Ltu1 is opposite to the configuration direction of the next-level light-emitting circuit CTem relative to the second gate line (such as LX2(n−2)~LX2(n+3)) electrically connected to each first break over line Ltu1.

In this embodiment, the first break over line Ltu1 is elbow-shaped, and the first break over line Ltu1 is disposed between the light-emitting circuit (such as CTem(n−2) ~CTem(n+3)) and the tiled boundary Etile.

Figure 2A:
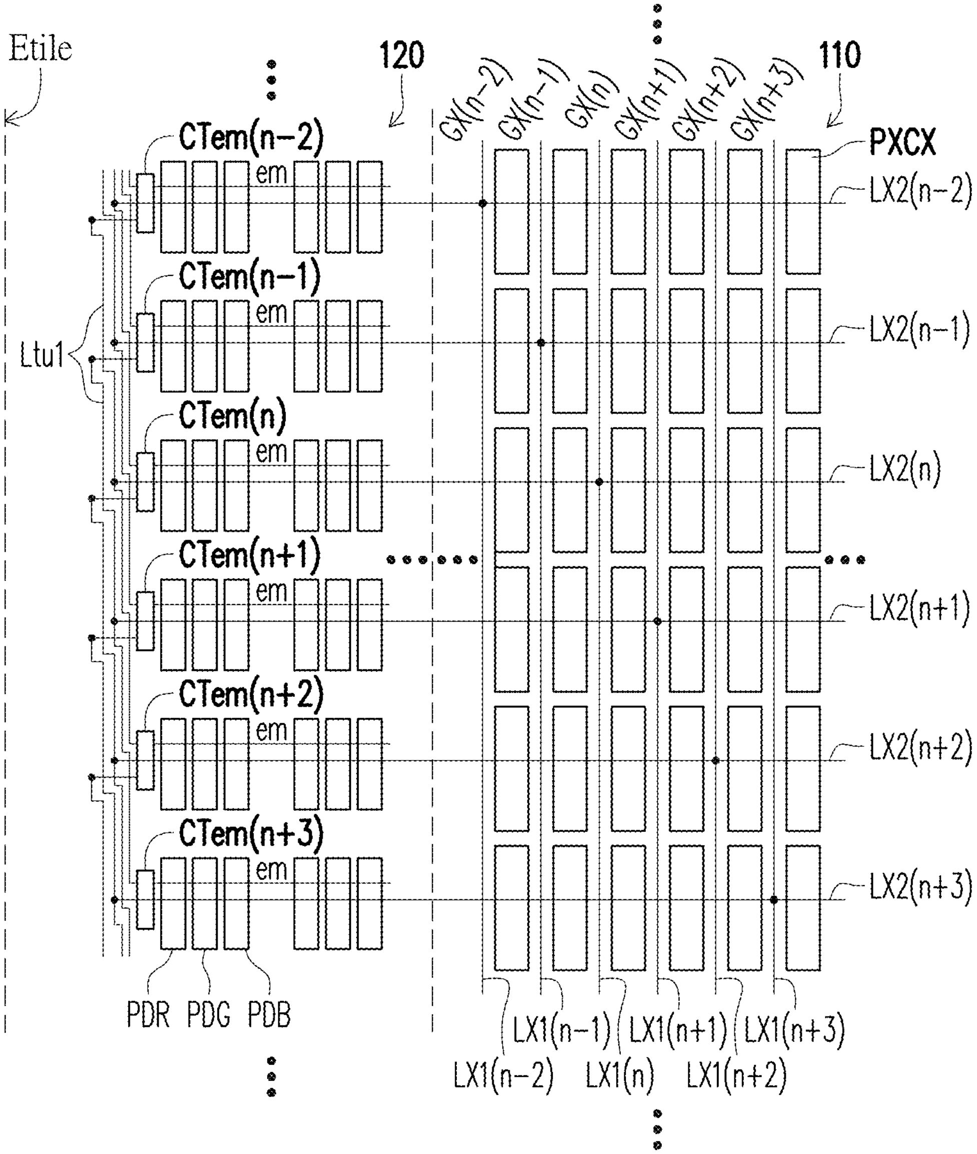
FIG. 2A to FIG. 2D are schematic wiring diagrams of a tiled display panel according to an embodiment of the disclosure.
Figure 2B:
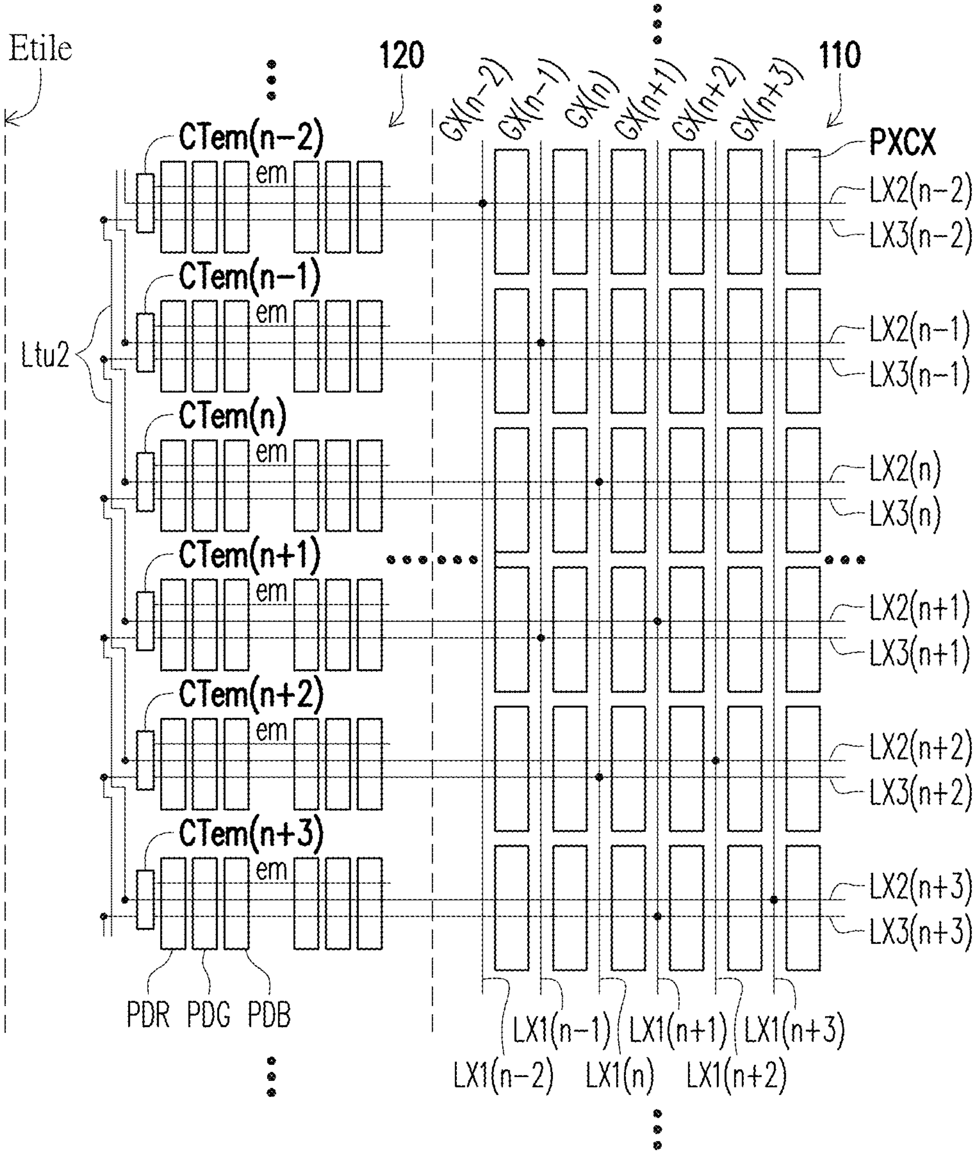

Please refer to FIG. 1, FIG. 2A, and FIG. 2B, where the same or similar elements use the same or similar reference numerals. In this embodiment, taking the substrate 101 as an example, a third gate line (such as LX3(n−2)~LX3(n+3)) may be disposed in the display region 110, and multiple second break over line lines Ltu2 may be disposed in the boundary region 120.

The third gate line (such as LX3(n−2)~LX3(n+3)) spans the display region 110 and the boundary region 120 along a second direction D2. Each third gate line (such as LX3(n−2)~LX3(n+3)) is located between two adjacent second gate lines (such as LX2(n−2)~LX2(n+3)), and is electrically connected to one (such as through a hole) of the first gate lines (such as LX1(n−2)~LX1(n+3)) and one of the light-emitting circuits (such as CTem(n−2)~CTem(n+3)). The second break over line Ltu2 is electrically connected to one of the second gate lines (such as LX2(n−2)~LX2(n+3)) respectively, and extends along the first direction D1 to be electrically connected to the first-level light-emitting circuit of the light-emitting circuit (such as CTem(n−2)~CTem(n+3)) respectively.

For example, the second break over line Ltu2 electrically connected to the second gate line LX2(n) extends up along the first direction D1 to be electrically connected to the light-emitting circuit CTem(n−2) (that is, the first two levels of the light-emitting circuit CTem), but the embodiment of the disclosure is not limited thereto. In other words, the second break over line Ltu2 may be electrically connected to the first three levels of the light-emitting circuit CTem, or the second break over line Ltu2 may be electrically connected to the first one level of the light-emitting circuit CTem, which depends on the circuit design.

In this embodiment, the first gate line (such as LX1(n−2)~LX1(n+3)) electrically connected to each third gate line (such as LX3(n−2)~LX3(n+3)) is closer to the boundary region 120 than the first gate line (such as LX1(n−2)~LX1 (n+3)) electrically connected to the adjacent second gate line (such as LX2(n−2)~LX2(n+3)).

For example, the first gate line LX1(n−2) electrically connected to the third gate line LX3(n) is closer to the boundary region 120 than the first gate line LX1(n) electrically connected to the second gate line LX2(n) and the first gate line LX1(n 1) electrically connected to the second gate line LX2(n 1).

In this embodiment, the second break over line Ltu2 is elbow-shaped, and the second break over line Ltu2 is disposed between the light-emitting circuit (such as CTem (n−2)~CTem(n+3)) and the tiled boundary Etile.

Figure 2C:
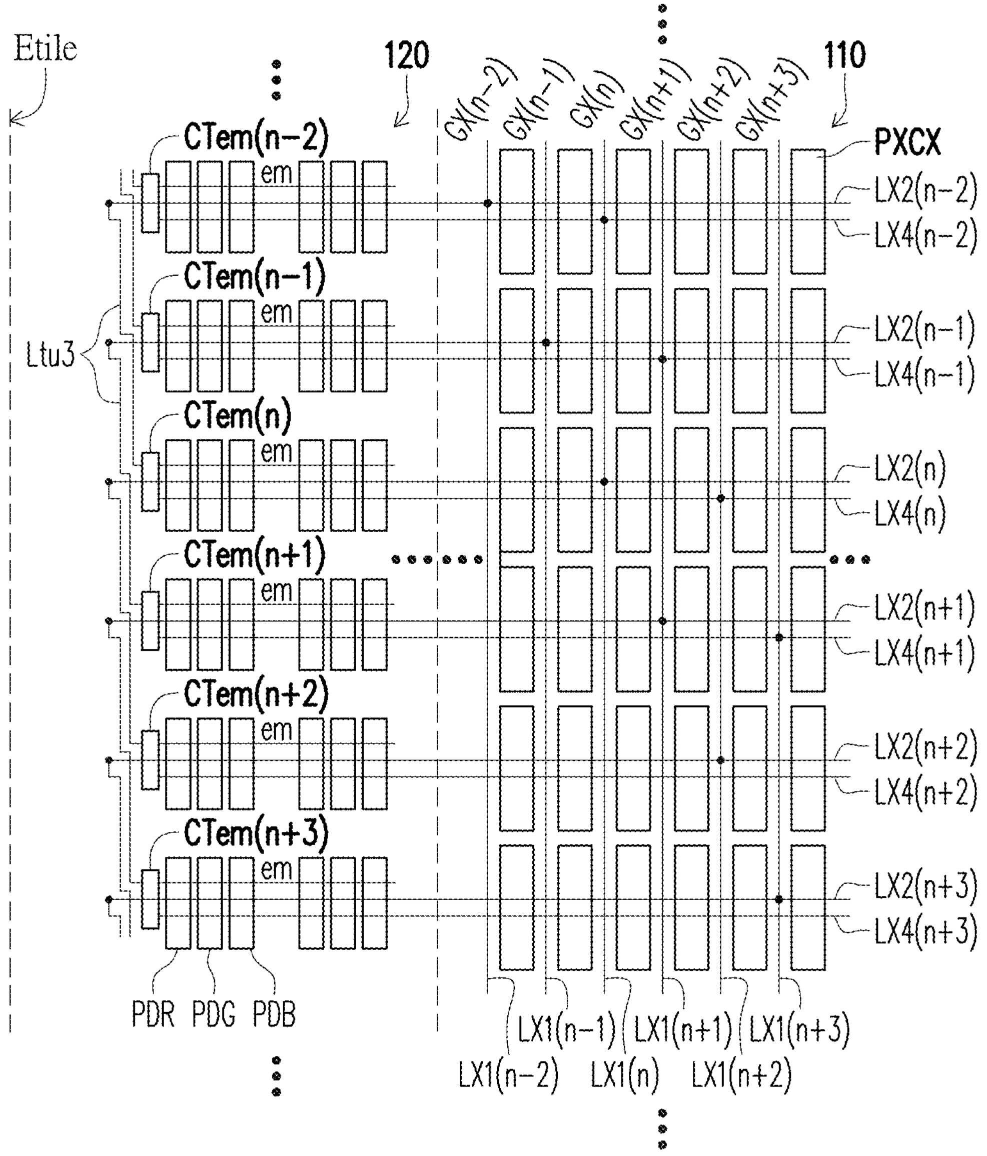
Figure 2D:
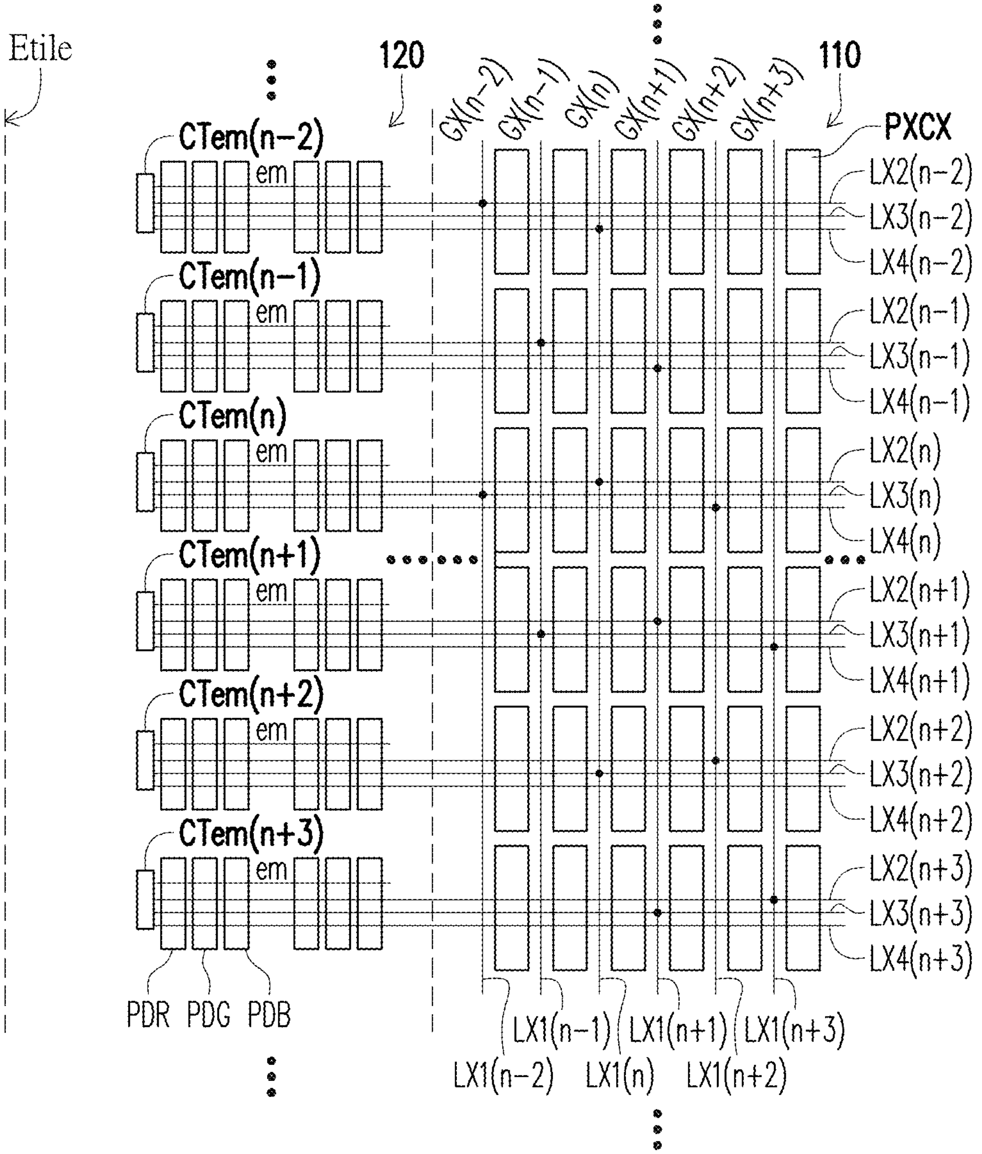

Please refer to FIG. 1, FIG. 2A, and FIG. 2C, where the same or similar elements use the same or similar reference numerals. In this embodiment, taking the substrate 101 as an example, a fourth gate line (such as LX4(n−2)~LX4(n+3)) may be disposed in the display region 110, and multiple third break over lines Ltu3 may be disposed in the boundary region 120.

The fourth gate line (such as LX4(n−2)~LX4(n+3)) spans the display region 110 and the boundary region 120 along the second direction D2. Each fourth gate line (such as LX4(n−2)~LX4(n+3)) is located between two adjacent second gate lines (such as LX2(n−2)~LX2(n+3)), and is electrically connected to one (such as through a hole) of the first gate lines (such as LX1(n−2)~LX1(n+3)) and one of the light-emitting circuits (such as CTem(n−2)~CTem(n+3)). The third break over line Ltu3 is electrically connected to one of the second gate lines (such as LX2(n−2)~LX2(n+3)) respectively, and extends along the first direction D1 to be electrically connected to the next-level light-emitting circuit of the light-emitting circuit (such as CTem(n)−2)~CTem(n+3)) respectively.

For example, the third break over line Ltu3 electrically connected to the second gate line LX2(n) extends down along the first direction D1 to be electrically connected to the light-emitting circuit CTem(n+2) (that is, the next two levels of the light-emitting circuit CTem), but the embodiment of the disclosure is not limited thereto. In other words, the third break over line Ltu3 may be electrically connected to the next three levels of the light-emitting circuit CTem, or the third break over line Ltu3 may be electrically connected to the next one level of the light-emitting circuit CTem, which depends on the circuit design.

In this embodiment, the first gate line (such as LX1(n−2)~LX1(n+3)) electrically connected to each fourth gate line (such as LX4(*n*−2)~LX4(*n*+3)) is further away from the boundary region 120 than the first gate line (such as LX1 (*n*−2)~LX1(*n*+3)) electrically connected to the adjacent second gate line (such as LX2(*n*−2)~LX2(*n*+3)).

For example, the first gate line LX1(*n*+2) electrically connected to the fourth gate line LX4(*n*) is further away from the boundary region 120 than the first gate line LX1(*n*) electrically connected to the second gate line LX2(*n*) and the first gate line LX1(*n*+1) electrically connected to the second gate line LX2(*n*+1).

In this embodiment, the third break over line Ltu3 is elbow-shaped, and the third break over line Ltu3 is disposed between the light-emitting circuit (such as CTem(n−2) ~CTem(n+3)) and the tiled boundary Etile.

Please refer to FIG. 1 and FIG. 2A to FIG. 2D, where the same or similar elements use the same or similar reference numerals. In this embodiment, taking the substrate 101 as an example, the third gate line (such as LX3(*n*−2)~LX3(*n*+3)) and the fourth gate line (such as LX4(*n*−2)~LX4(*n*+3)) (corresponding to a fifth gate line and a sixth gate line) may be disposed in the display region 110, but no break over line is disposed in the boundary region 120. The configuration of the third gate line (such as LX3(*n*−2)~LX3(*n*+3)) and the fourth gate line (such as LX4(*n*−2)~LX4(*n*+3)) may be referred to FIG. 2B and FIG. 2C, which is not described again here.

Figure 3:
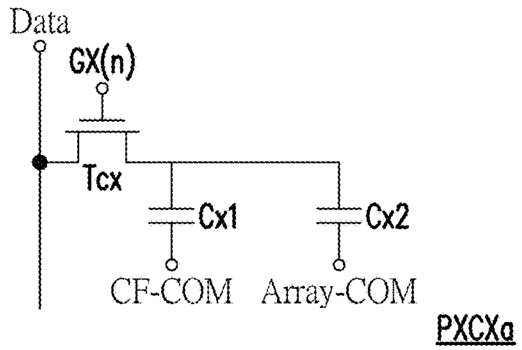
FIG. 3 is a schematic circuit diagram of a liquid crystal pixel according to an embodiment of the disclosure.

FIG. 3 is a schematic circuit diagram of a liquid crystal pixel according to an embodiment of the disclosure. Please refer to FIG. 1 and FIG. 3. In this embodiment, the liquid crystal pixel PXCX takes a liquid crystal pixel PXCXa as an example, and the liquid crystal pixel PXCXa includes a switch transistor Tex, a first pixel capacitance Cx1, and a second pixel capacitance Cx2. The switch transistor Tex has a first terminal receiving a pixel data voltage Data, a control terminal receiving a gate signal GX(n) (corresponding to a first gate signal), and a second terminal. The first pixel capacitance Cx1 is coupled between the second terminal of the switch transistor Tex and a first common terminal CF-COM. The second pixel capacitance Cx2 is coupled between the second terminal of the switch transistor Tex and a second common terminal Array-COM.

Figure 4:
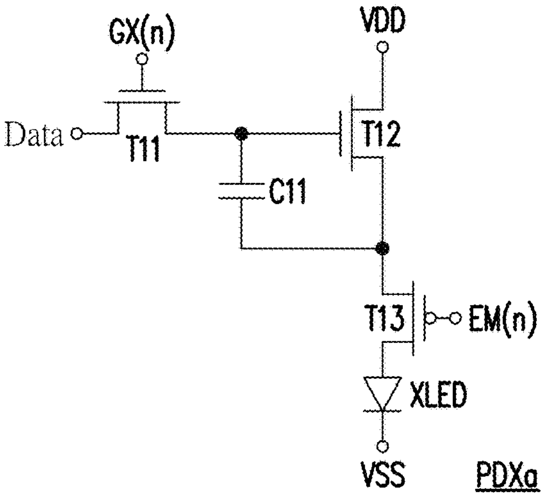
FIG. 4 is a schematic circuit diagram of an LED pixel according to an embodiment of the disclosure.

FIG. 4 is a schematic circuit diagram of an LED pixel according to an embodiment of the disclosure. Please refer to FIG. 1 and FIG. 4. In this embodiment, the red LED pixel PDR, the green LED pixel PDG, and the blue LED pixel PDB take a LED pixel PDXa as an example, and the LED pixel PDXa includes a LED XLED, transistors T11-T13 (corresponding to a first transistor to a third transistor), and a capacitance C11 (corresponding to a first capacitance). The transistors T11-T13 take an N-type transistor as an example, and the LED XLED may be the red LED, the green LED, or the blue LED.

The LED XLED has an anode and a cathode receiving a system low voltage VSS. The transistor T11 has a first terminal receiving the pixel data voltage Data, a control terminal receiving the gate signal GX(n), and a second terminal. The transistor T12 has a first terminal receiving the system high voltage VDD, a control terminal coupled to the second terminal of the transistor T11, and a second terminal. The transistor T13 has a first terminal coupled to the second terminal of the transistor T12, a control terminal receiving the light-emitting signal EM(n) (that is, a corresponding one of the light-emitting signals em), and a second terminal coupled to the anode of the LED. The capacitance C11 is coupled between the control terminal of the transistor T12 and the second terminal of the transistor T12.

Figure 5:
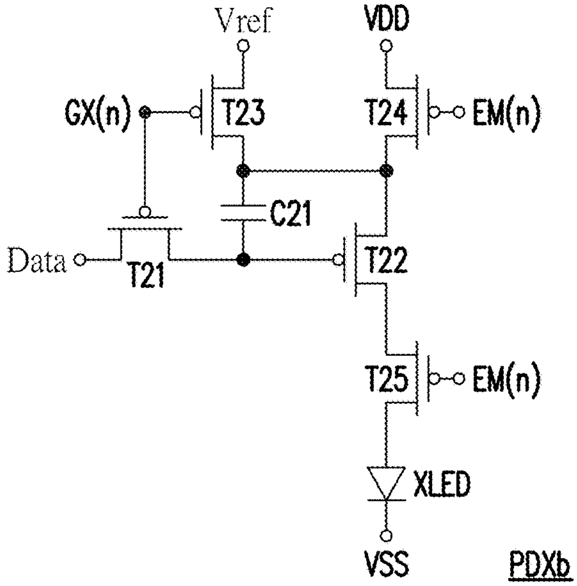
FIG. 5 is a schematic circuit diagram of an LED pixel according to an embodiment of the disclosure.

FIG. 5 is a schematic circuit diagram of an LED pixel according to an embodiment of the disclosure. Please refer to FIG. 1 and FIG. 5. In this embodiment, the red LED pixel PDR, the green LED pixel PDG, and the blue LED pixel PDB take a LED pixel PDXb as an example, and the LED pixel PDXb includes a LED XLED, transistors T21-T25 (corresponding to a fourth transistor to an eighth transistor), and a capacitance C21 (corresponding to a second capacitance). The transistors T21-T25 take a P-type transistor as an example, and the LED XLED may be the red LED, the green LED, or the blue LED.

The LED XLED has an anode and a cathode receiving the system low voltage VSS. The transistor T21 has a first terminal receiving the pixel data voltage Data, a control terminal receiving the gate signal GX(n), and a second terminal. The transistor T22 has a first terminal, a control terminal coupled to the second terminal of the transistor T21, and a second terminal. The capacitance C21 is coupled between the first terminal of transistor T21 and the control terminal of the transistor T22. The transistor T23 has a first terminal receiving a reference voltage Vref, a control terminal receiving the gate signal GX(n), and a second terminal coupled to the first terminal of the transistor T22.

The transistor T24 has a first terminal receiving the system high voltage VDD, a control terminal receiving the light-emitting signal EM(n), and a second terminal coupled to the first terminal of the transistor T22. The transistor T25 has a first terminal coupled to the second terminal of the transistor T22, a control terminal receiving the light-emitting signal EM(n), and a second terminal coupled to the anode of the LED XLED.

Figure 6:
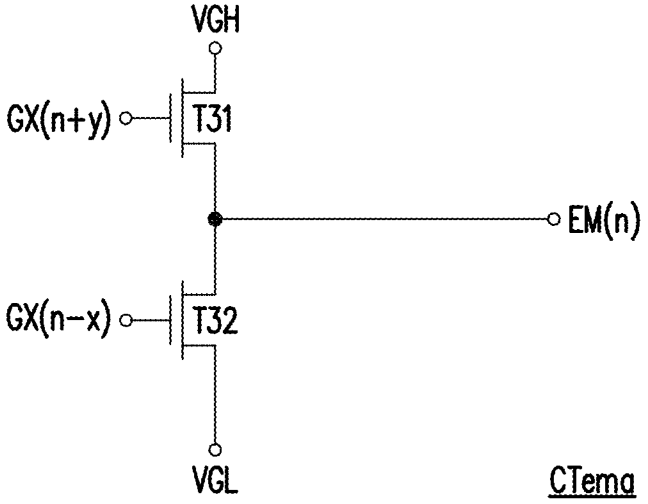
FIG. 6 is a schematic circuit diagram of a light-emitting circuit according to an embodiment of the disclosure.

FIG. 6 is a schematic circuit diagram of a light-emitting circuit according to an embodiment of the disclosure. Please refer to FIG. 1 and FIG. 6. In this embodiment, the light-emitting circuit CTem takes a light-emitting circuit CTema as an example, and the light-emitting circuit CTema includes transistors T31 and T32 (corresponding to a ninth transistor and a tenth transistor). The transistors T31-T32 take the N-type transistor as an example.

The transistor T31 has a first terminal receiving a gate high voltage VGH, a control terminal receiving the gate signal GX(ny) (corresponding to a second gate signal), and a second terminal providing (or coupled to) the light-emitting signal EM(n). The transistor T32 has a first terminal coupled to the second terminal of the transistor T31, a control terminal receiving the gate signal GX(nx) (corresponding to a third gate signal), and a second terminal that receiving a gate low level VGL. In this embodiment, x and y may be a positive integer, and x may be different from y.

Figure 7:
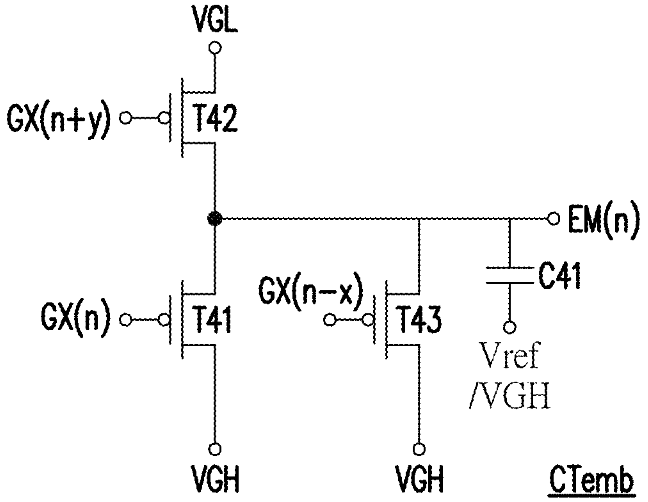
FIG. 7 is a schematic circuit diagram of a light-emitting circuit according to an embodiment of the disclosure.

FIG. 7 is a schematic circuit diagram of a light-emitting circuit according to an embodiment of the disclosure. Please refer to FIG. 1 and FIG. 7. In this embodiment, the light-emitting circuit CTem takes a light-emitting circuit CTemb as an example, and the light-emitting circuit CTemb includes transistors T41-T43 and a capacitance C41. The transistors T41-T43 take the P-type transistor as an example.

The transistor T41 has a first terminal coupled to the light-emitting signal EM(n), a control terminal receiving the gate signal GX(n), and a second terminal receiving the gate high voltage VGH. The transistor T42 has a first terminal receiving a gate low voltage VGL, a control terminal receiving the gate signal GX(ny), and a second terminal coupled to the first terminal of the transistor T41. The transistor T43 has a first terminal coupled to the first terminal of the transistor T41, a control terminal receiving the gate signal GX(nx), and a second terminal receiving the gate high voltage VGH. The capacitance C41 is coupled between the first terminal of the transistor T41 and one of the reference voltage Vref and the gate high voltage VGH.

Figure 8:
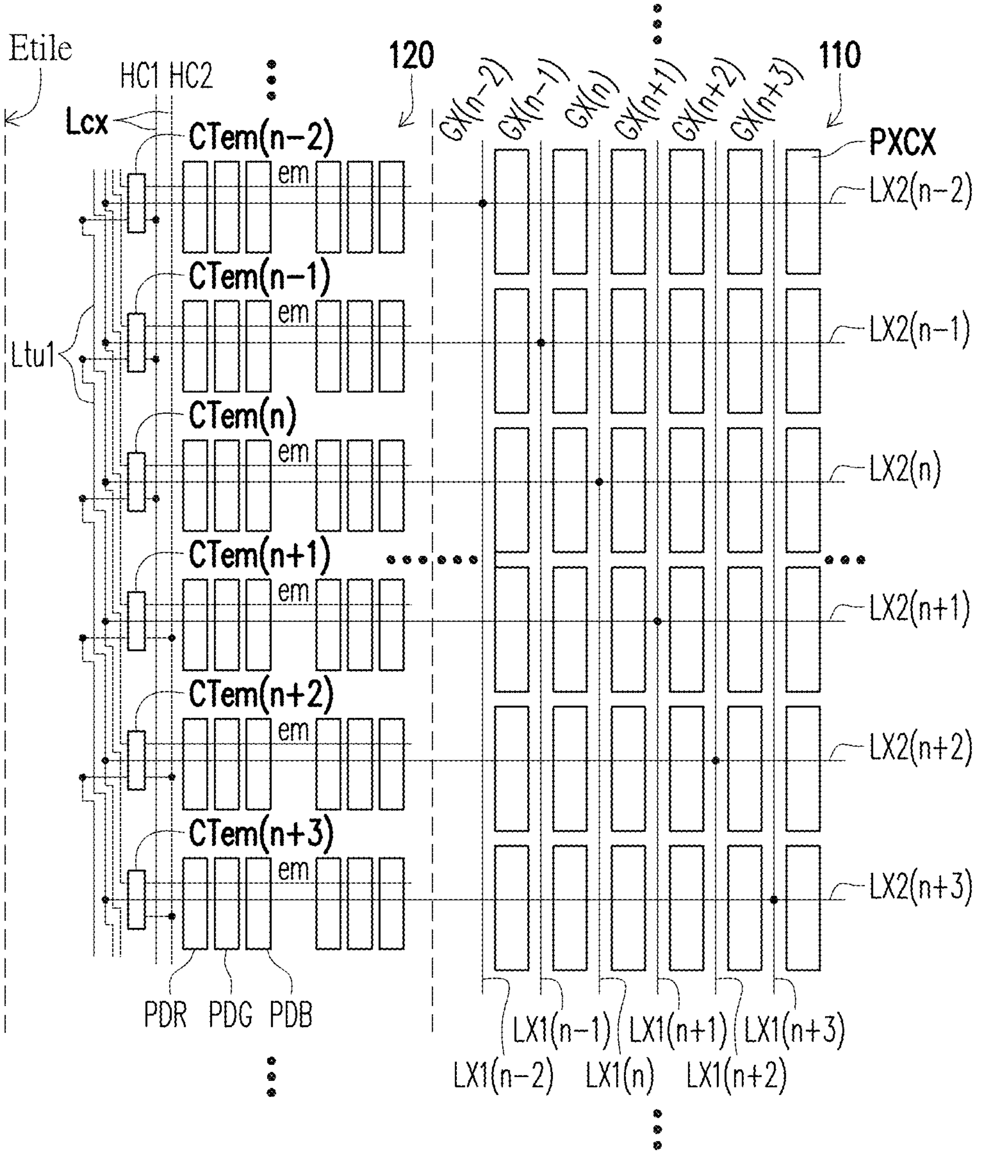
FIG. 8 is a schematic wiring diagram of a tiled display panel according to an embodiment of the disclosure.

FIG. 8 is a schematic wiring diagram of a tiled display panel according to an embodiment of the disclosure. Please refer to FIG. 1, FIG. 2A, and FIG. 8. In this embodiment, taking the substrate 101 as an example, multiple clock lines LCX may be disposed in the boundary region 120 (two clock lines LCX are shown here as an example). The clock line LCX spans the boundary region 120 along the first direction D1 and is electrically connected to the light-emitting circuit CTem to transmit multiple clock signals (such as HC1 and HC2) to the light-emitting circuit CTem correspondingly. Multiple adjacent light-emitting circuits CTem may receive the same clock signal (such as HC1 and HC2), that is, adjacent rows of the red LED pixels PDR, the green LED pixels PDG, and the blue LED pixels PDB are lit up simultaneously after completing data writing.

In the embodiment of the disclosure, the number of clock lines LCX may be determined according to the design requirements. Further, when the number of clock lines LCX is smaller, the wiring cost of the tiled display panel 100 is lower; on the contrary, when the number of clock lines LCX is larger, the time setting flexibility of the clock signals (such as HC1 and HC2) becomes higher.

Figure 9:
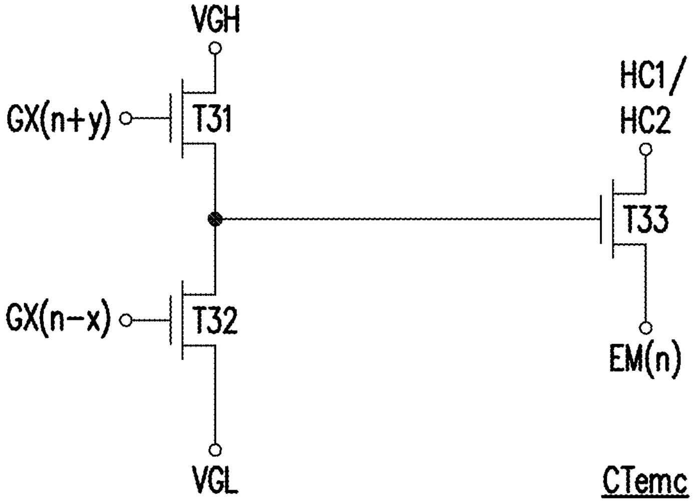
FIG. 9 is a schematic circuit diagram of a light-emitting circuit according to an embodiment of the disclosure.

FIG. 9 is a schematic circuit diagram of a light-emitting circuit according to an embodiment of the disclosure. Please refer to FIG. 1, FIG. 6, FIG. 8, and FIG. 9. In this embodiment, the light-emitting circuit CTem takes a light-emitting circuit CTemc as an example, and the light-emitting circuit CTemc is roughly the same as the light-emitting circuit CTema. The difference lies in that the light-emitting circuit CTemc further includes a transistor T33 (corresponding to an eleventh transistor). The transistor T33 takes the N-type transistor as an example. The transistor T33 has a first terminal receiving one of the clock signals (such as the clock signals HC1 and HC2), a control terminal coupled to the second terminal of the transistor T31, and a second terminal providing (or coupled to) the light-emitting signal EM(n).

Figure 10:
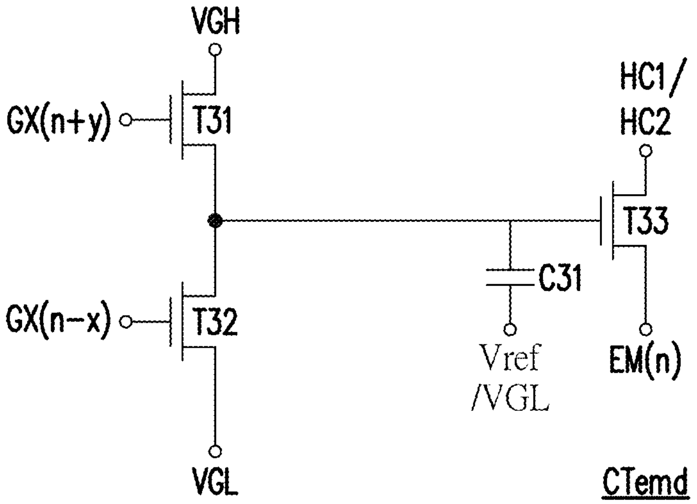
FIG. 10 is a schematic circuit diagram of a light-emitting circuit according to an embodiment of the disclosure.

FIG. 10 is a schematic circuit diagram of a light-emitting circuit according to an embodiment of the disclosure. Please refer to FIG. 1, FIG. 6, FIG. 9, and FIG. 10. In this embodiment, the light-emitting circuit CTem takes a light-emitting circuit CTemd as an example, and the light-emitting circuit CTemd is roughly the same as the light-emitting circuit CTemc. The difference lies in that the light-emitting circuit CTemc further includes a capacitance C31 (corresponding to a third capacitance). The capacitance C31 is coupled between the second terminal of the transistor T31 and one of the reference voltage Vref and the gate low level VGL.

Figure 11:
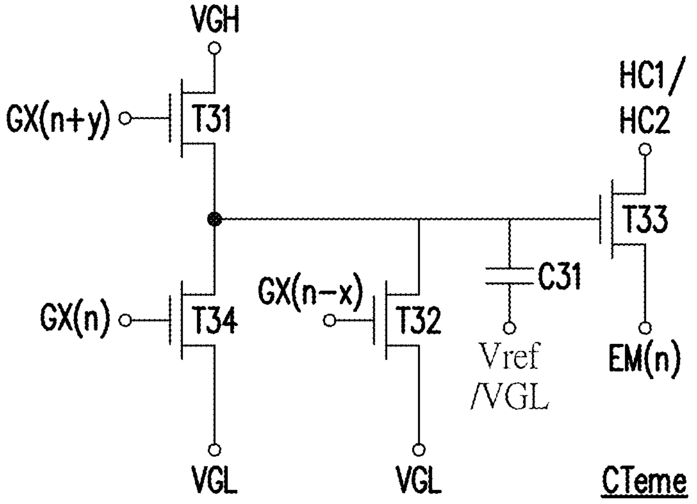
FIG. 11 is a schematic circuit diagram of a light-emitting circuit according to an embodiment of the disclosure.

FIG. 11 is a schematic circuit diagram of a light-emitting circuit according to an embodiment of the disclosure. Please refer to FIG. 1, FIG. 6, FIG. 10, and FIG. 11. In this embodiment, the light-emitting circuit CTem takes a light-emitting circuit CTeme as an example, and the light-emitting circuit CTeme is roughly the same as the light-emitting circuit CTemd. The difference lies in that the light-emitting circuit CTemd further includes a transistor T34 (corresponding to a twelfth transistor). The transistor T34 has a first terminal coupled to the second terminal of the transistor T31, a control terminal receiving the gate signal GX(n) (corresponding to a fourth gate signal), and a second terminal receiving the gate low level VGL.

Figure 12:
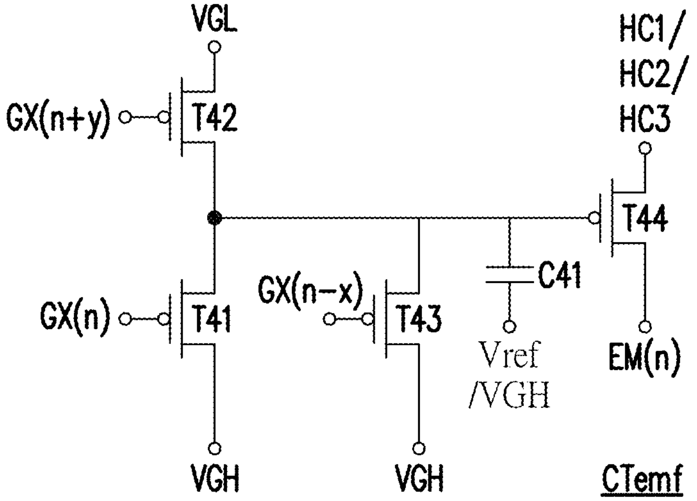
FIG. 12 is a schematic circuit diagram of a light-emitting circuit according to an embodiment of the disclosure.

FIG. 12 is a schematic circuit diagram of a light-emitting circuit according to an embodiment of the disclosure. Please refer to FIG. 1, FIG. 7, FIG. 8, and FIG. 12. In this embodiment, the light-emitting circuit CTem takes a light-emitting circuit CTemf as an example, and the light-emitting circuit CTemf is roughly the same as the light-emitting circuit CTemb. The difference lies in that the light-emitting circuit CTemf further includes a transistor T44. The transistor T44 takes the P-type transistor as an example. The transistor T44 has a first terminal receiving one of the clock signals (such as the clock signals HC1-HC3), a control terminal coupled to the first terminal of the transistor T41, and a second terminal providing (or coupled to) the light-emitting signal EM(n).

Figure 13A:
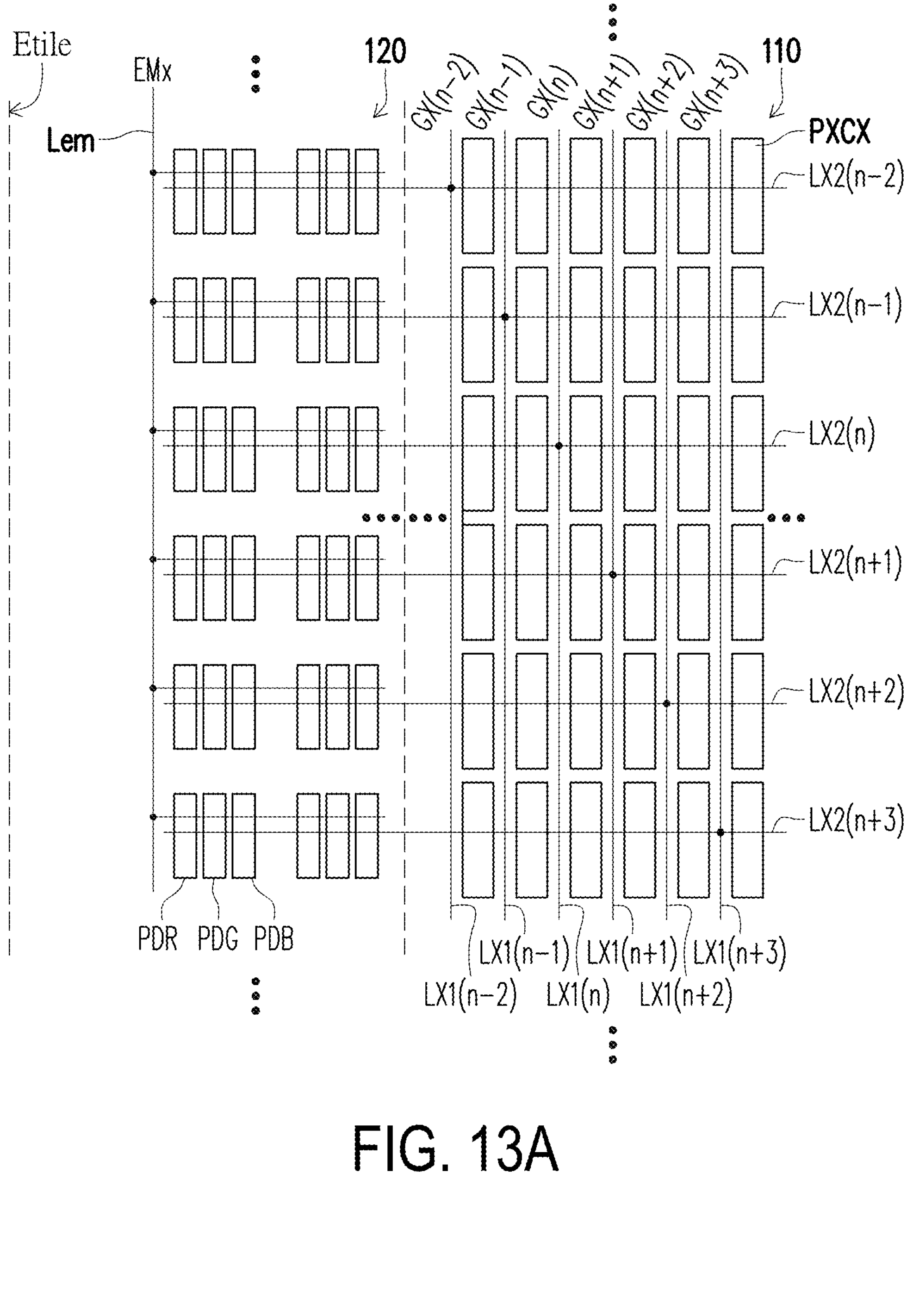
FIG. 13A is a schematic wiring diagram of a tiled display panel according to an embodiment of the disclosure.

FIG. 13A is a schematic wiring diagram of a tiled display panel according to an embodiment of the disclosure. Please refer to FIG. 1, FIG. 2A, and FIG. 13A. In this embodiment, taking the substrate 101 as an example, a single light-emitting driving line Lem may be disposed in the boundary region 120 to replace the light-emitting circuit CTem. The light-emitting driving line Lem spans the boundary region 120 along the first direction D1, receives a light-emitting signal EMx, and is electrically connected to the red LED pixel PDR, the green LED pixel PDG, and the blue LED pixel PDB in the array to transmit the light-emitting signal EMx simultaneously to all the red LED pixels PDR, the green LED pixels PDG, and the blue LED pixels PDB in the array. The red LED pixels PDR, the green LED pixels PDG, and the blue LED pixels PDB are lit up simultaneously after completing data writing.

Figure 13B:
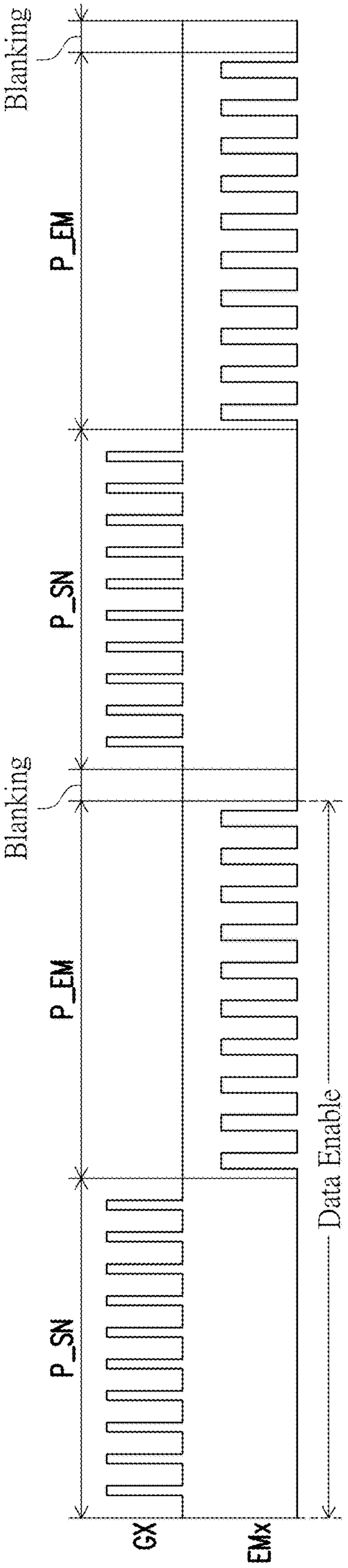
FIG. 13B is a schematic diagram of driving waveforms of a tiled display panel according to an embodiment of the disclosure.

FIG. 13B is a schematic diagram of driving waveforms of a tiled display panel according to an embodiment of the disclosure. Please refer to FIG. 1, FIG. 2A, FIG. 13A, and FIG. 13B. In this embodiment, the single frame period at least includes a data enable period DataEnable and a vertical blank period Blanking. Moreover, the data enable period DataEnable may be divided into at least a pixel scanning period P_SN and a pixel emission period P_EM.

During the pixel scanning period P_SN, the liquid crystal pixel PXCX, the red LED pixel PDR, the green LED pixel PDG, and the blue LED pixel PDB are opened row by row for data writing. Next, after the data is written, the pixel emission period P_EM is entered. During the pixel emission period P_EM, the red LED pixel PDR, the green LED pixel PDG, and the blue LED pixel PDB are lit up simultaneously and multiple times. Moreover, during the vertical blank period, the tiled display panel 100 may not display images, that is, the tiled display panel 100 may not perform any operations. In other words, the light-emitting signal EMx may light up the red LED pixel PDR, the green LED pixel PDG, and the blue LED pixel PDB simultaneously in the data enable period DataEnable of each frame period.

In the embodiment of the disclosure, a voltage pulse wave of the light-emitting signal EMx may be modulated. For example, the voltage pulse wave of the light-emitting signal EMx may determine the number of voltage pulse waves of the light-emitting signal EMx in the single pixel emission period P_EM according to the gray scale of the frame. For example, when the frame is brighter, the number of voltage pulse waves may be greater; when the frame is darker, the number of voltage pulse waves may be smaller, which depends on the circuit design, and the embodiment of the disclosure is not limited thereto.

In the embodiment of the disclosure, the proportions of the pixel scanning period P_SN and the pixel emission period P_EM to the single frame period may be changed. For example, when the number of voltage pulse waves of the light-emitting signal EMx is small, the time length of the pixel scanning period P_SN may be longer; when the number of voltage pulse waves of the light-emitting signal EMx is large, the time length of the pixel scanning period P_SN may be shorter, which depends on the circuit design, and the embodiment of the disclosure is not limited thereto.

Figure 13C:
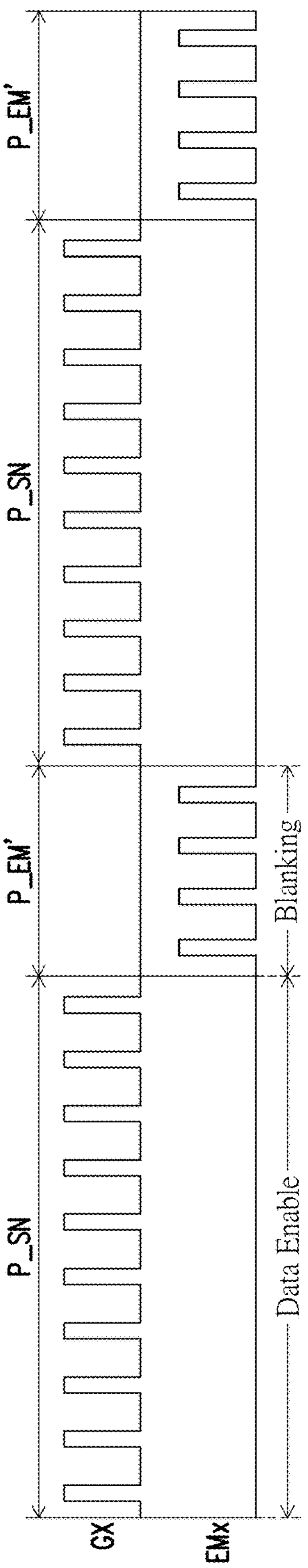
FIG. 13C is a schematic diagram of driving waveforms of a tiled display panel according to an embodiment of the disclosure.

FIG. 13C is a schematic diagram of driving waveforms of a tiled display panel according to an embodiment of the disclosure. Please refer to FIG. 1, FIG. 2A, FIG. 13A, and FIG. 13C. In this embodiment, the single frame period at least includes a data enable period DataEnable and a vertical blank period Blanking. Moreover, the data enable period DataEnable may be operated as the pixel scanning period P_SN, and the vertical blank period Blanking may be operated as a pixel emission period P_EM'.

During the pixel scanning period P_SN, the liquid crystal pixel PXCX, the red LED pixel PDR, the green LED pixel PDG, and the blue LED pixel PDB are opened row by row for data writing. Next, after the data is written, the pixel emission period P_EM' is entered. During the pixel emission period P_EM', the red LED pixel PDR, the green LED pixel PDG, and the blue LED pixel PDB are lit up simultaneously and multiple times. In other words, the light-emitting signal EMx lights up the red LED pixel PDR, the green LED pixel PDG, and the blue LED pixel PDB simultaneously in the vertical blank period Blanking of each frame period.

Figure 14:
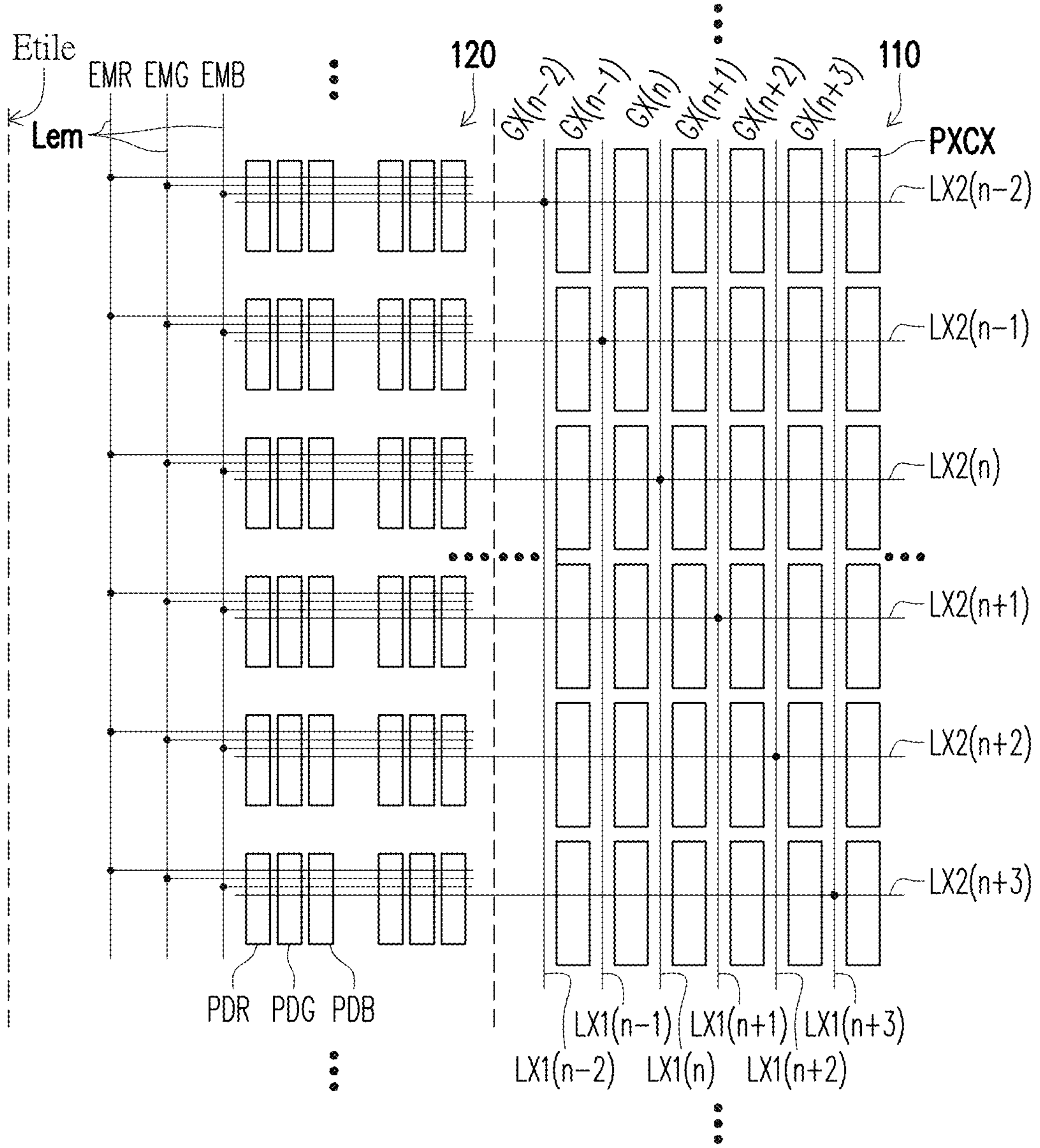
FIG. 14 is a schematic wiring diagram of a tiled display panel according to an embodiment of the disclosure.

FIG. 14 is a schematic wiring diagram of a tiled display panel according to an embodiment of the disclosure. Please refer to FIG. 1, FIG. 2A, and FIG. 14. In this embodiment, taking the substrate 101 as an example, three light-emitting driving lines Lem may be further disposed in the boundary region 120 to replace the light-emitting circuit CTem. The light-emitting driving line Lem spans the boundary region 120 along the first direction D1 and receives the red light-emitting signal EMR, the green light-emitting signal EMG, and the blue light-emitting signal EMB respectively. The light-emitting driving line Lem (corresponding to a first light-emitting driving line) receiving the red light-emitting signal EMR is electrically connected to the red LED pixel PDR in the array to transmit the red light-emitting signal EMR to all the red LED pixels PDR in the array; the light-emitting driving line Lem (corresponding to a second light-emitting driving line) receiving the green light-emitting signal EMG is electrically connected to the green LED pixel PDG in the array to transmit the green light-emitting signal EMG to all the green LED pixels PDG in the array; moreover, the light-emitting driving line Lem (corresponding to a third light-emitting driving line) receiving the blue light-emitting signal EMG is electrically connected to the blue LED pixel PDB in the array to transmit the blue light-emitting signal EMB to all the blue LED pixels PDB in the array. Furthermore, after the red LED pixel PDR, the green LED pixel PDG, and the blue LED pixel PDB complete data writing, the red LED pixel PDR may determine the lighting time length based on the red light-emitting signal EMR (or the voltage pulse wave thereof) and/or the number of lighting times, the green LED pixel PDG may determine the lighting time length and/or the number of lighting times based on the green light-emitting signal EMG (or the voltage pulse wave thereof), and the blue LED pixel PDB may determine the lighting time length and/or the number of lighting times based on the blue light-emitting signal EMG (or the voltage pulse wave thereof).

Figure 15:
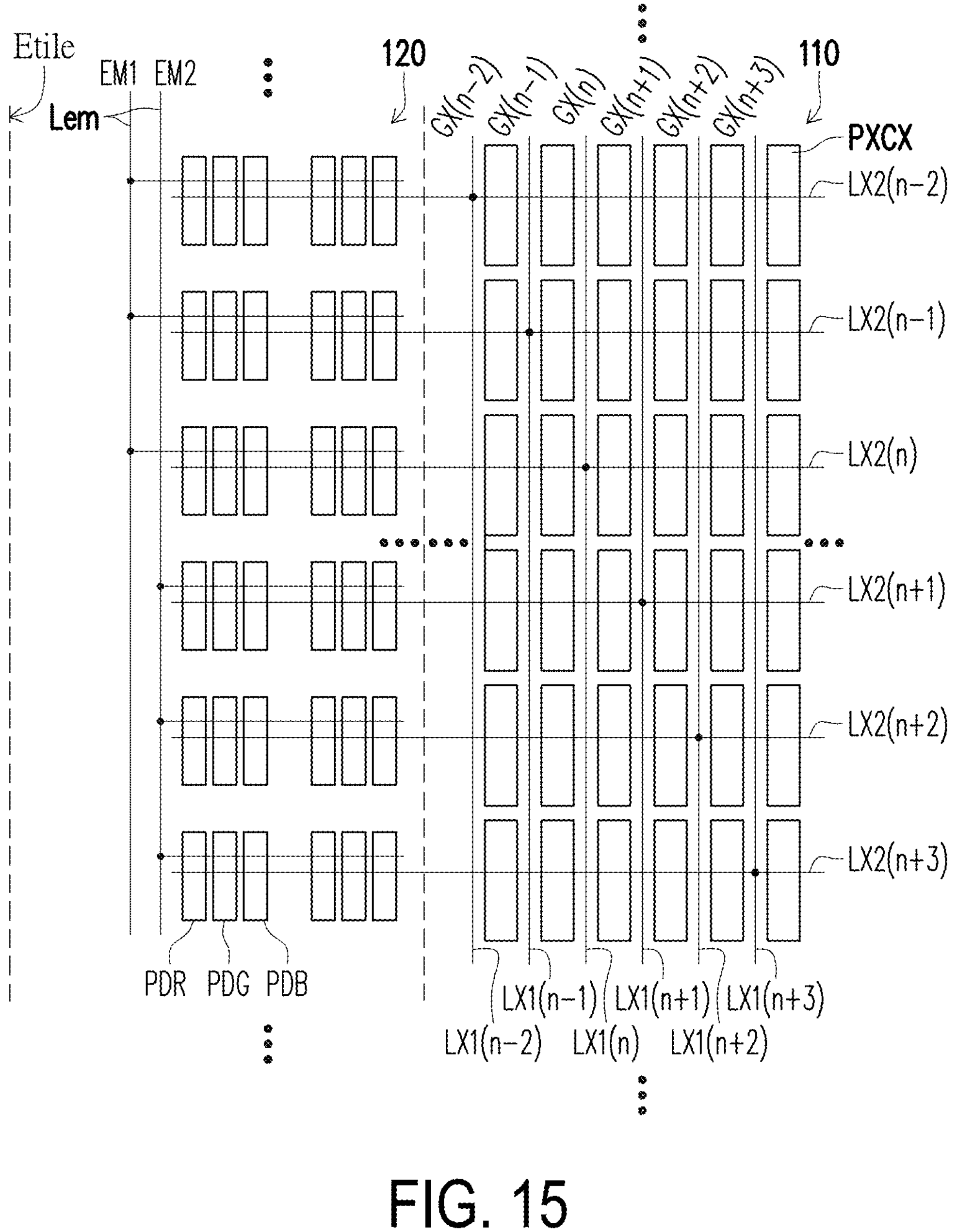
FIG. 15 is a schematic wiring diagram of a tiled display panel according to an embodiment of the disclosure.

FIG. 15 is a schematic wiring diagram of a tiled display panel according to an embodiment of the disclosure. Please refer to FIG. 1, FIG. 2A, and FIG. 15. In this embodiment, taking the substrate 101 as an example, the light-emitting driving lines Lem may be disposed in the boundary region 120 (two light-emitting driving lines Lem are shown here as an example) to replace the light-emitting circuit CTem. The light-emitting driving line Lem spans the boundary region 120 along the first direction D1 and is electrically connected to the red LED pixel PDR, the green LED pixel PDG, and the blue LED pixel PDB in the array to transmit multiple light-emitting signals (such as EM1 and EM2) correspondingly to the red LED pixel PDR, the green LED pixel PDG, and the blue LED pixel PDB in the array. The adjacent rows of red LED pixels PDR, green LED pixels PDG, and blue LED pixels PDB may receive the same light-emitting signal (such as EM1 and EM2), that is, the adjacent rows of red LED pixels PDR, green LED pixels PDG, and blue LED pixel PDB write data in groups, and are lit up simultaneously according to the group after completing data writing.

In the embodiment of the disclosure, the light-emitting driving line Lem may be disposed between the red LED pixel PDR, the green LED pixel PDG, the blue LED pixel PDB, and the tiled boundary Etile, or may be disposed between the red LED pixel PDR, the green LED pixel PDG, and the blue LED pixel PDB, which depends on the circuit design requirements, and the embodiment of the disclosure is not limited thereto.

In the embodiment of the disclosure, the number of light-emitting driving lines Lem may be determined according to design requirements. Further, when the number of light-emitting driving lines Lem is smaller, the wiring cost of the tiled display panel 100 is lower; on the contrary, when the number of light-emitting driving lines Lem is greater, the flexibility in time setting of the light-emitting signals (such as EM1 and EM2) becomes higher.

In summary, in the tiled display panel according to the embodiment of the disclosure, the LED pixel may be lit up based on the light-emitting signal of the light-emitting circuit. In this way, the LED pixel may be driven normally, and the seamless tiled effect can be achieved by taking the advantage of the borderless LED pixel. Moreover, the light-emitting signal may be provided for the LED pixel by the light-emitting driving line to drive the LED pixel normally. Alternatively, the light-emitting driving line may be used to replace the light-emitting circuit to transmit the light-emitting signal to drive the LED pixel.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A tiled display panel, comprising:

a plurality of substrates, wherein each of the plurality of substrates has a display region and at least one boundary region, and the at least one boundary region is respectively located between the display region and a tiled boundary tiled by the plurality of substrates;

a plurality of liquid crystal pixels, arranged in an array in the display region;

a plurality of light-emitting diode (LED) pixels, arranged in an array in the at least one boundary region;

a plurality of light-emitting circuits, arranged in series in the at least one boundary region along a first direction and electrically connected to the plurality of LED pixels to provide a plurality of light-emitting signals for the plurality of LED pixels;

a plurality of first gate lines, spanning the display region along the first direction and receiving a plurality of gate signals; and a plurality of second gate lines, spanning the display region and the at least one boundary region along a second direction perpendicular to the first direction, wherein each of the plurality of second gate lines is electrically connected to one or part of the plurality of first gate lines, part of the plurality of liquid crystal pixels, and part of the plurality of LED pixels.

2. The tiled display panel according to claim 1, wherein the plurality of light-emitting circuits are arranged in series between the plurality of LED pixels and the tiled boundary.

3. The tiled display panel according to claim 1, further comprising:

a plurality of first break over lines, electrically connected to one of the plurality of second gate lines respectively, and extending along the first direction respectively to be electrically connected to a first-level light-emitting circuit and a next-level light-emitting circuit of the plurality of light-emitting circuits.

4. The tiled display panel according to claim 3, wherein a configuration direction of the first-level light-emitting circuit relative to the second gate line electrically connected to each of the plurality of first break over lines is opposite to a configuration direction of the next-level light-emitting circuit relative to the second gate line electrically connected to each of the plurality of first break over lines.

5. The tiled display panel according to claim 1, further comprising:

a plurality of second break over lines, electrically connected to one of the plurality of second gate lines respectively, and extending along the first direction to be electrically connected to a first-level light-emitting circuit of the plurality of light-emitting circuits respectively; and a plurality of third gate lines, spanning the display region and the at least one boundary region along the second direction, wherein each of the plurality of third gate lines is located between two adjacent second gate lines and is electrically connected to one of the plurality of first gate lines and one of the plurality of light-emitting circuits, and the first gate line electrically connected to each of the third gate lines is closer to the at least one boundary region than the first gate line electrically connected to the plurality of adjacent second gate lines.

6. The tiled display panel according to claim 1, further comprising:

a plurality of third break over lines, electrically connected to one of the plurality of second gate lines respectively, and extending along the first direction to be electrically connected to a next-level light-emitting circuit of the plurality of light-emitting circuits respectively; and a plurality of fourth gate lines, spanning the display region and the at least one boundary region along the second direction, wherein each of the plurality of fourth gate lines is located between two adjacent second gate lines and is electrically connected to one of the plurality of first gate lines and one of the plurality of light-emitting circuits, and the first gate line electrically connected to each of the plurality of fourth gate lines is further away from the at least one boundary region than the first gate lines electrically connected to the plurality of adjacent second gate lines.

7. The tiled display panel according to claim 1, further comprising:

a plurality of fifth gate lines, spanning the display region and the at least one boundary region along the second direction, wherein each of the plurality of fifth gate lines is located between two adjacent second gate lines and is electrically connected to one of the plurality of first gate lines and one of the plurality of light-emitting circuits, and the first gate line electrically connected to each of the fifth gate lines is closer to the at least one boundary region than the plurality of first gate lines electrically connected to the plurality of adjacent second gate lines; and a plurality of sixth gate lines, spanning the display region and the at least one boundary region along the second direction, wherein each of the plurality of sixth gate lines is located between two adjacent second gate lines and is electrically connected to one of the plurality of first gate lines and one of the plurality of light-emitting circuits, and the first gate line electrically connected to each of the plurality of sixth gate lines is further away from the at least one boundary region than the plurality of first gate lines electrically connected to the plurality of adjacent second gate lines.

8. The tiled display panel according to claim 1, wherein each of the plurality of liquid crystal pixels comprises:

a switch transistor, having a first terminal receiving a pixel data voltage, a control terminal receiving a first gate signal of the plurality of gate signals, and a second terminal;

a first pixel capacitance, coupled between the second terminal of the switch transistor and a first common terminal; and a second pixel capacitance, coupled between the second terminal of the switch transistor and a second common terminal.

9. The tiled display panel according to claim 1, wherein each of the plurality of LED pixels comprises:

a light-emitting diode (LED), having an anode and a cathode receiving a system low voltage;

a first transistor, having a first terminal receiving a pixel data voltage, a control terminal receiving a first gate signal of the plurality of gate signals, and a second terminal;

a second transistor, having a first terminal receiving a system high voltage, a control terminal coupled to the second terminal of the first transistor, and a second terminal;

a third transistor, having a first terminal coupled to the second terminal of the second transistor, a control terminal receiving a corresponding one of the plurality of light-emitting signals, and a second terminal coupled to the anode of the LED; and a first capacitance, coupled between the control terminal of the second transistor and the second terminal of the second transistor.

10. The tiled display panel according to claim 1, wherein each of the plurality of LED pixels includes:

an LED, having an anode and a cathode receiving a system low voltage;

a fourth transistor, having a first terminal receiving a pixel data voltage, a control terminal receiving a first gate signal of the plurality of gate signals, and a second terminal;

a fifth transistor, having a first terminal, a control terminal coupled to the second terminal of the fourth transistor, and a second terminal;

a second capacitance, coupled between the first terminal of the fifth transistor and the control terminal of the fifth transistor;

a sixth transistor, having a first terminal receiving a reference voltage, a control terminal receiving the first gate signal, and a second terminal coupled to the first terminal of the fifth transistor;

a seventh transistor, having a first terminal receiving a system high voltage, a control terminal receiving a corresponding one of the plurality of light-emitting signals, and a second terminal coupled to the first terminal of the fifth transistor; and an eighth transistor, having a first terminal coupled to the second terminal of the fifth transistor, a control terminal receiving a corresponding one of the plurality of light-emitting signals, and a second terminal coupled to the anode of the LED.

11. The tiled display panel according to claim 1, wherein each of the plurality of light-emitting circuits comprises:

a ninth transistor, having a first terminal receiving a gate high voltage, a control terminal receiving a second gate signal of the plurality of gate signals, and a second terminal coupled to a corresponding one of the plurality of light-emitting signals; and a tenth transistor, having a first terminal coupled to the second terminal of the ninth transistor, a control terminal receiving a third gate signal of the plurality of gate signals, and a second terminal receiving a gate low level.

12. The tiled display panel according to claim 11, wherein each of the plurality of light-emitting circuits further comprises:

an eleventh transistor, having a first terminal receiving one of a plurality of clock signals, a control terminal coupled to the second terminal of the ninth transistor, and a control terminal coupled to the corresponding one of the plurality of light-emitting signals.

13. The tiled display panel according to claim 11, wherein each of the plurality of light-emitting circuits comprises:

a third capacitance, coupled between the second terminal of the ninth transistor and one of a reference voltage and the gate low level.

14. The tiled display panel according to claim 11, wherein each of the plurality of light-emitting circuits comprises:

a twelfth transistor, having a first terminal coupled to the second terminal of the ninth transistor, a control terminal receiving a fourth gate signal of the plurality of gate signals, and a second terminal receiving the gate low level.

15. The tiled display panel according to claim 1, further comprising:

a plurality of clock lines, receiving a plurality of clock signals and electrically connected to the plurality of light-emitting circuits to transmit the plurality of clock signals to the plurality of light-emitting circuits respectively.

16. The tiled display panel according to claim 1, wherein a material of the plurality of substrates comprises one of a P-type amorphous silicon (a-Si) substrate, an N-type amorphous silicon (a-Si) substrate, an indium gallium zinc oxide (IGZO) substrate, and a low-temperature polycrystalline silicon (LTPS) substrate.

17. The tiled display panel according to claim 1, wherein the plurality of LED pixels comprise a plurality of red LED pixels, a plurality of green LED pixels, and a plurality of blue LED pixels.

* * * * *